United States Patent [19]
McCabe

[11] 3,936,379
[45] Feb. 3, 1976

[54] FAIL SAFE DEVICE

[75] Inventor: Ralph Patrick McCabe, Troy, Mich.

[73] Assignee: Colt Industries Operating Corporation, New York, N.Y.

[22] Filed: Aug. 12, 1974

[21] Appl. No.: 496,556

Related U.S. Application Data

[62] Division of Ser. No. 355,819, April 30, 1973.

[52] U.S. Cl. .................. 210/131; 210/132; 210/356
[51] Int. Cl.² ............................................. B01D 29/36
[58] Field of Search ............ 210/131, 132, 354, 356

[56] References Cited
UNITED STATES PATENTS

| | | | |
|---|---|---|---|
| 1,781,874 | 11/1930 | Hopkins | 210/131 |
| 2,192,438 | 3/1940 | Gulick | 210/131 |
| 2,597,217 | 5/1952 | Zenick | 210/131 |
| 2,647,767 | 8/1953 | Anderson | 210/356 X |
| 3,468,420 | 9/1969 | Rosaen | 210/131 X |
| 3,485,369 | 12/1969 | Voorheis | 210/132 X |
| 3,830,368 | 8/1974 | Rogers | 210/131 X |

Primary Examiner—John Adee

[57] ABSTRACT

A housing having a chamber has an inlet and an outlet for directing therethrough a fluid under pressure to an associated fluid pressure responsive apparatus; a filter situated generally in the path of flow of such fluid becomes effective after it experiences a degree of clogging by dirt to open an additional outlet as to thereby enable such fluid under pressure to be directed to the fluid pressure responsive apparatus through such additional outlet.

8 Claims, 7 Drawing Figures

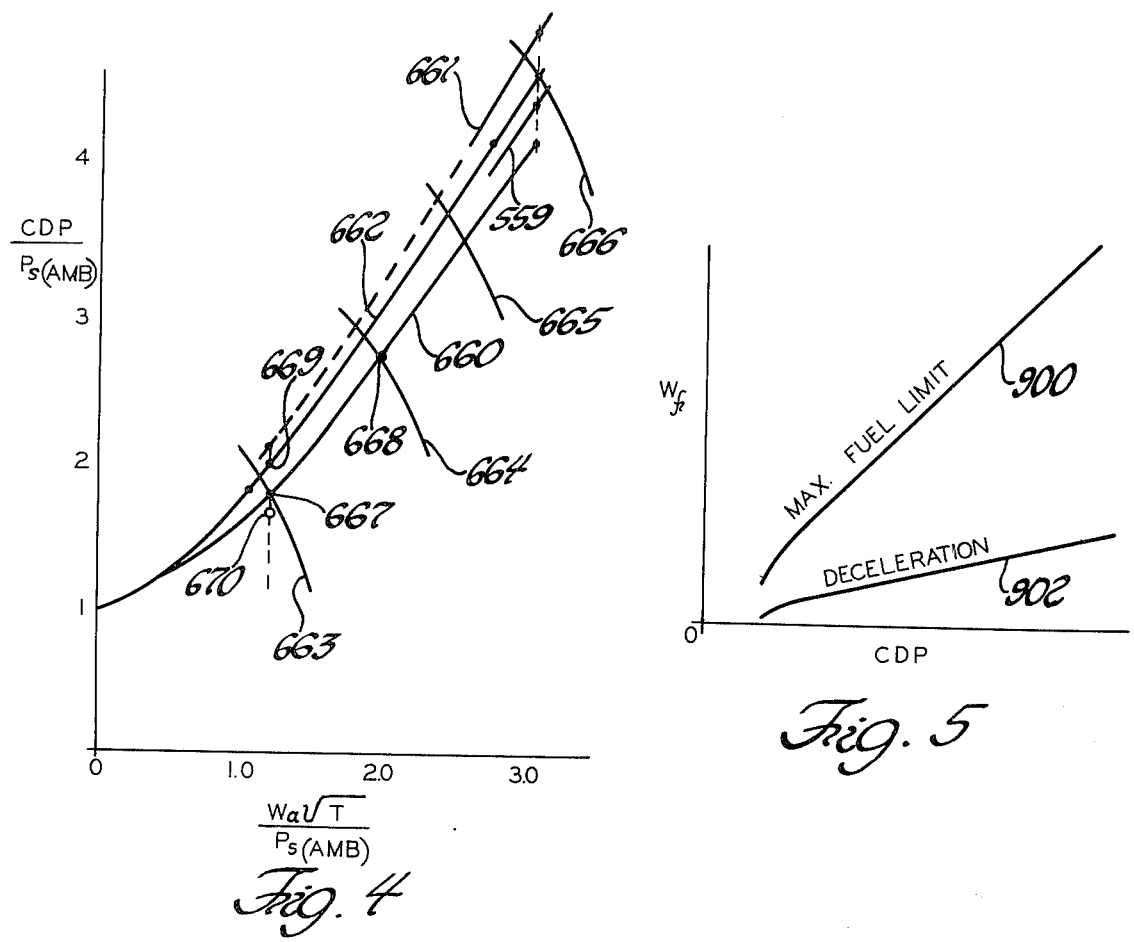
Fig. 4
Fig. 5
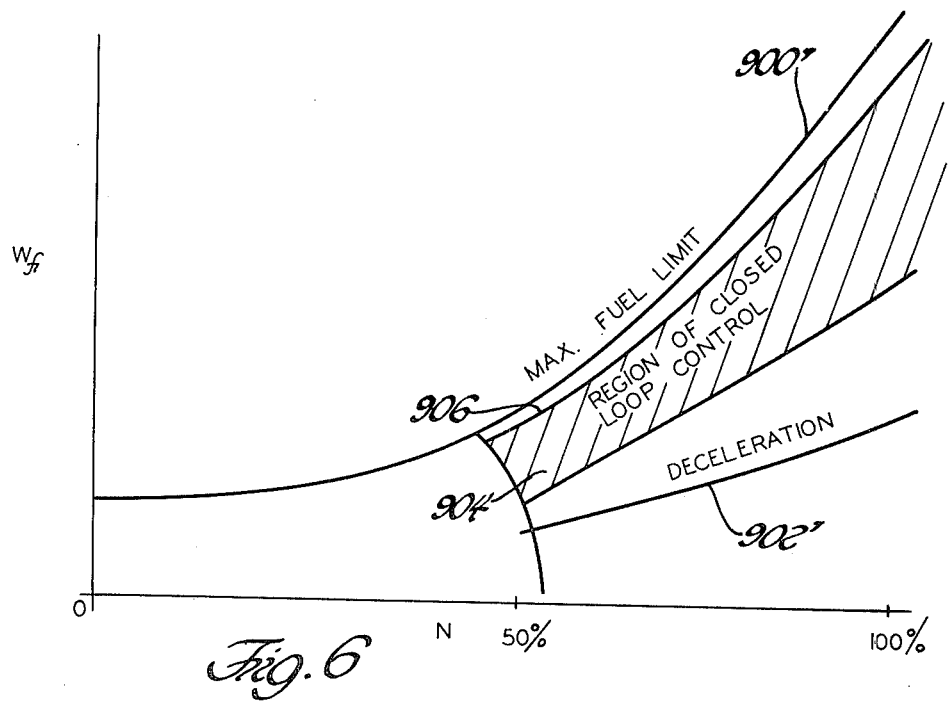
Fig. 6

FAIL SAFE DEVICE

RELATED APPLICATION

This application is a division of my co-pending application, Ser. No. 355,819 filed on Apr. 30, 1973.

BACKGROUND OF THE INVENTION

In many situations in the prior art, as in for example, turbine engine fuel controls, a gauged or sensed flow through fluid pressure is employed for in turn conveying a signal pressure to related apparatus which appropriately respond thereto. That is, some circumstances, again with respect to turbine engine fuel control systems for example, an engine operating parameter may be sensed in the form of a variable magnitude fluid pressure which varies to be indicative of such operating parameter. Such fluid pressure may, in turn, be directed to associated apparatus which, for example, may respond thereto in a manner whereby a reduction in the magnitude of the fluid pressure sensed by such associated apparatus causes such associated apparatus to react by dictating that an increased rate of fuel flow should be delivered to the engine.

Quite often in such systems employing pressurized fluid flow, suitable filter means must be provided as to continuously filter dirt and foreign particles from the flowing pressurized fluid. Where such filter means are provided, for example, upstream of the said associated apparatus, problems have occurred because as the filter becomes progressively clogged with filtered dirt, the filter creates an increasing pressure drop thereacross with the result that the said associated apparatus senses what it believes to be an actual reduction in the magnitude of the pressurized fluid caused by a change in the engine operating parameter and consequently results in a greater rate of fuel flow to the engine whereas, in reality, the actual reduction in magnitude of pressurized fluid was due solely to the filter becoming clogged with dirt. In such situations, the erroneously increased rate of fuel flow may well be damaging to the engine.

Accordingly, the invention as herein disclosed and described is primarily directed to the solution of the above as well as other related problems.

SUMMARY OF THE INVENTION

According to the invention, a fail safe device has a housing defining chamber means, an inlet for admitting a relatively high pressure fluid thereto, a first outlet for directing said fluid from said chamber means to associated means for action upon said associated means in response to the magnitude of said fluid pressure, and filter means situated generally in the path of flow of said fluid, second outlet means for at times directing said fluid pressure to said associated means, and valving means for controlling the communication between said second outlet means and said chamber means, said valving means being operatively controlled by the deflection experienced by said filter means due to a pressure differential thereacross generated by said fluid pressure due to an increasing restrictive effect to flow through said filter means created by clogging of said filter means as by particles of dirt.

Various specific and general objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and elements may be omitted from one or more views:

FIG. 4 is a graph illustrating engine curves of the invention obtained by plotting, generally, a function of engine compressor discharge pressure against a function of air flow;

FIG. 5 is a graph illustrating operating curves obtained by plotting fuel flow to the engine against compressor discharge pressure;

FIG. 6 is a graph illustrating, generally, operating curves and regions obtained by plotting fuel flow to the engine against engine speed.

DETAILED DESCRIPTION OF THE PREFERRED EMBODIMENT

Figure 1:
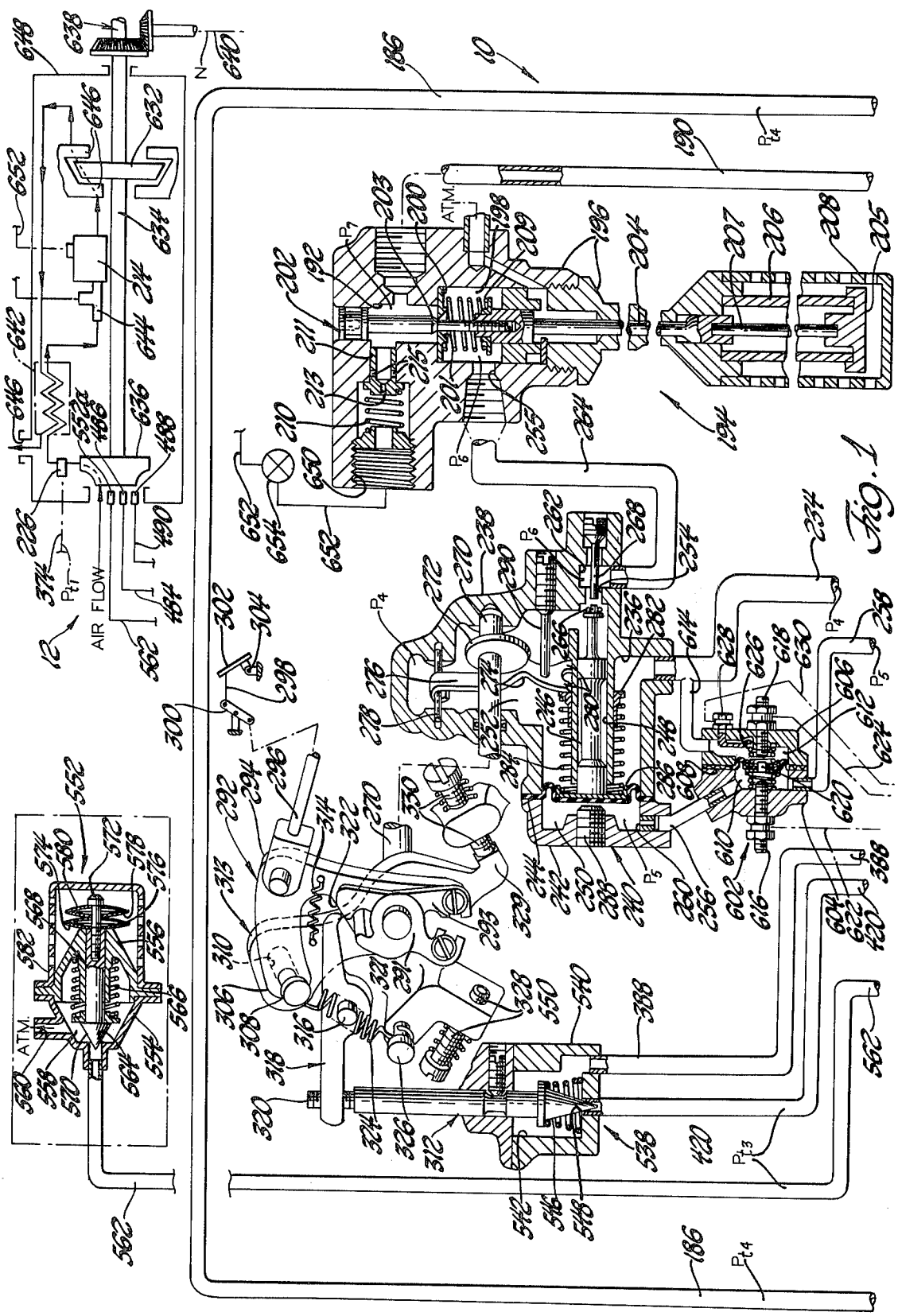
FIGS. 1, 2 and 3 are views each illustrating a portion of a fuel control constructed in accordance with the teachings of the invention which, when combined as indicated, illustrate the preferred embodiment of the turbine engine fuel control of the invention.
Figure 2:
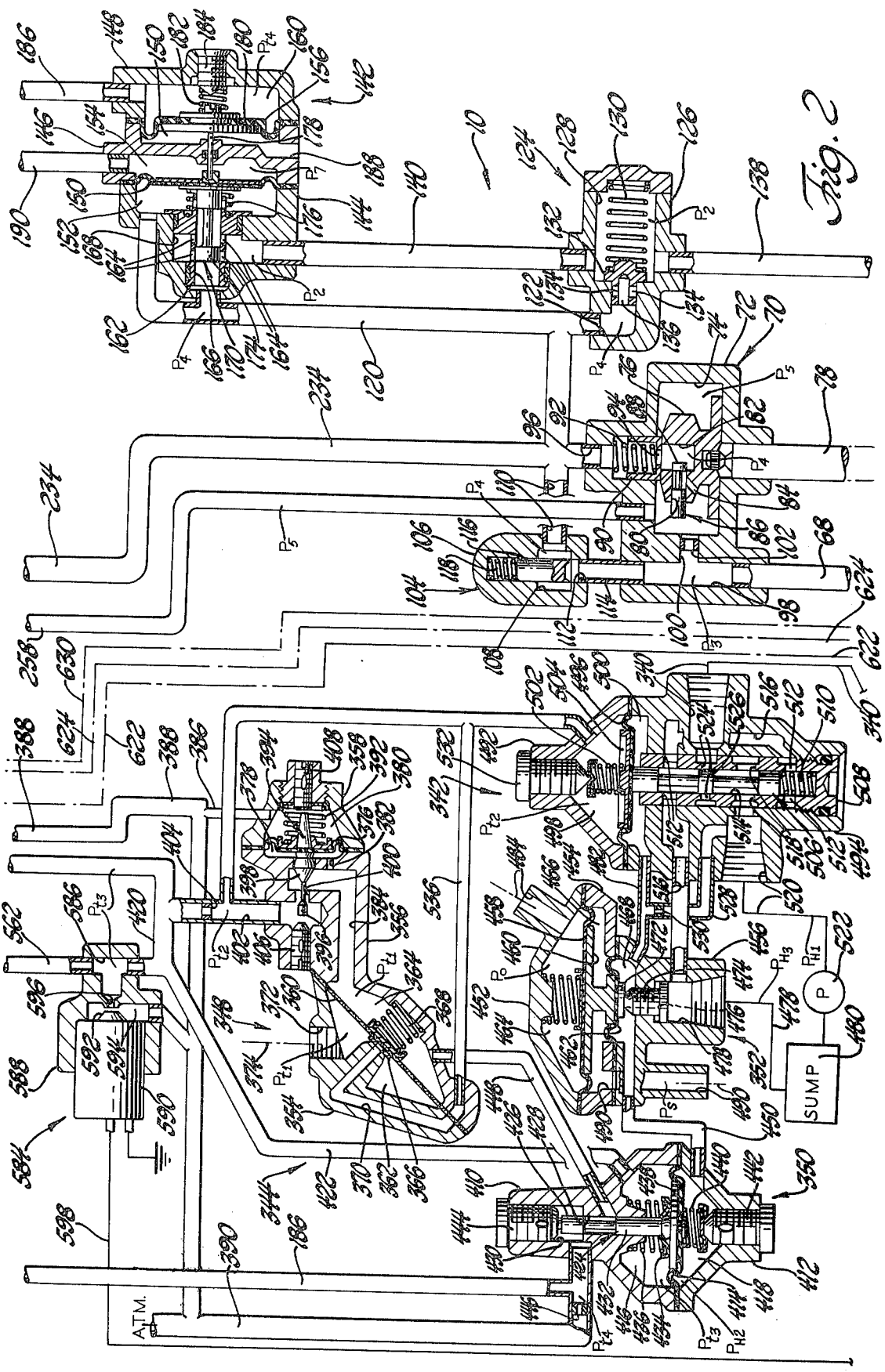
Figure 3:
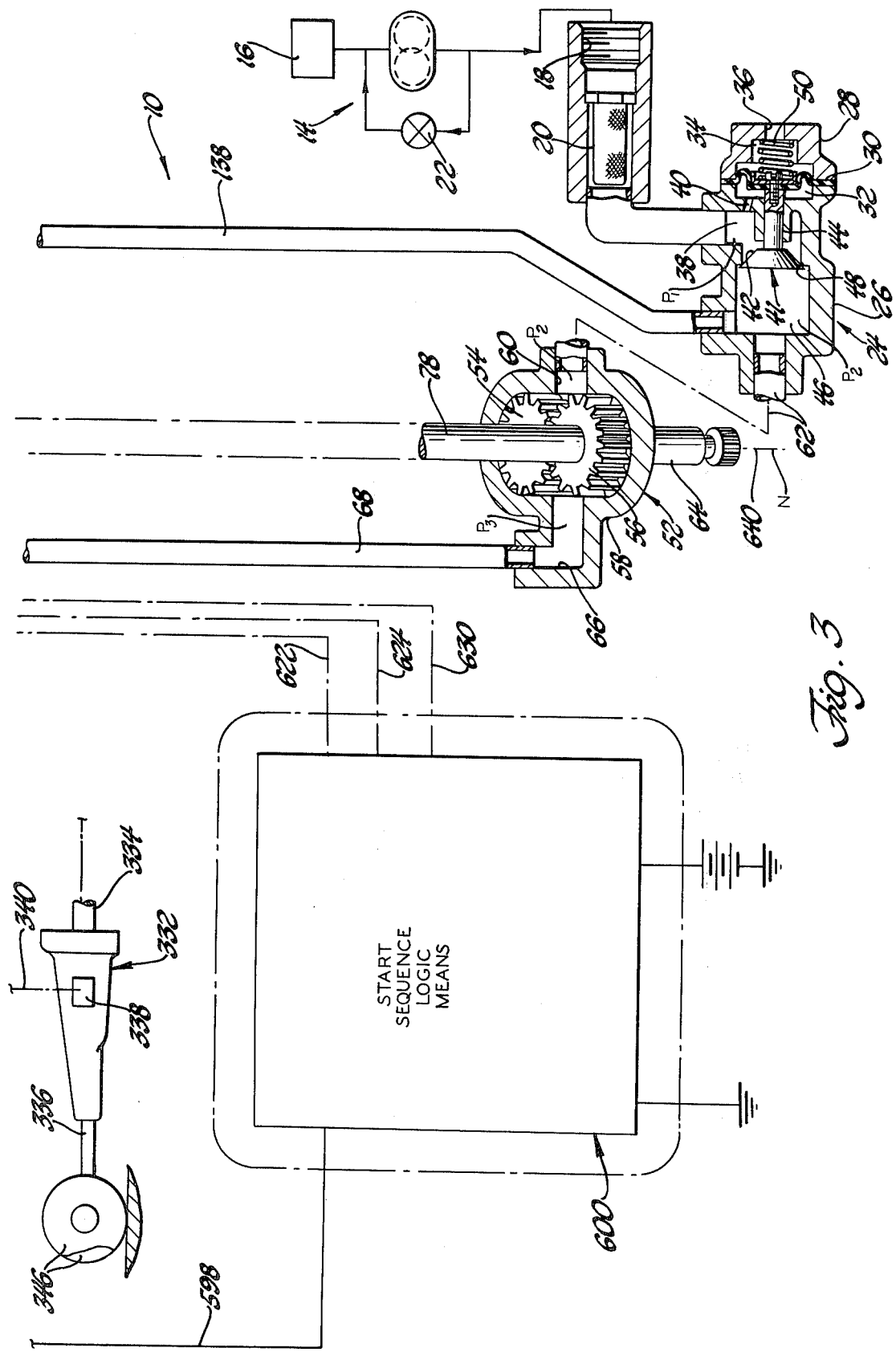

Referring now in greater detail to the drawings, FIGS. 1, 2 and 3 collectively illustrate a preferred embodiment of a fuel control system 10 employed for controlling the rate of metered fuel flow to an associated turbine engine 12 as well as controlling the load of such engine.

Suitable pumping means 14 provided, as in FIG. 3, functions to take fuel out of the related source of fuel 16 and supply such fuel to an inlet 18 of the fuel control 10 wherein suitable filter means such as a screen 20 is provided. The pumping means 14 may be provided with a pressure relief bypass valve 22; however, since any suitable pumping means may be employed, if pumping means 14 should be a centrifugal pump, no such bypass return system need be provided.

An inlet pressure regulator assembly 24 is illustrated as being comprised of housing portions 26 and 28 which cooperate with each other as to peripherally contain therebetween a pressure responsive diaphragm 30 and thereby define an opposite sides thereof chambers 32 and 34 with chamber 34 being vented as at 36 to the ambient atmosphere while chamber 32 is suitably placed in communication with a chamber 38, formed within housing portion 26, as by passage means 40. Throttling type valving means comprised as of a valve portion 42 and valve stem 44, suitably secured to the diaphragm 30, effectively determines separation of chamber 38 and a second chamber 46 within housing portion 26, as by cooperation of the valve portion 42 with a coacting annular valve seat 48. A spring 50 generally situated within chamber 34 normally urges diaphragm 30 and valving means 41 toward the left and in the opening direction.

A fuel pump assembly 52 is shown as being of the gear-type having gears or rotors 54 and 56 within a housing 58 so as to have an inlet 60 thereof in communication with chamber 46 of regulator 24 as via conduit means 62. Rotor 56 is suitably drivingly engaged to a shaft 64 which, as will later be discussed, is operatively connected to the engine 12. An outlet 66 of pump assembly 52 is placed in communication with related speed sensing means 70 (FIG. 2) as by conduit means 68.

The speed sensing means 70 may be comprised of housing means 72 defining therein a chamber 74 in which is situated a rotor 76 drivingly engaged to suitable motion transmitting means responsive to the speed of engine 12. Such motion transmitting means, as shown, may take the form of shaft means 78 operatively drivingly engaged to shaft 64 and, at its upper end, to rotor 76.

A first radially directed passage 80 formed in rotor 76 intersects and communicates with a centrally disposed axially aligned passage 82. A second somewhat radially disposed passage 84 communicates as between chamber 74 and passage 80. The degree to which communication is permitted between passage 80 and axial passage 82 is dependent upon the position of valving means 86 and valve portion 88 thereof.

A cup-like seal 90, urged into sealing engagement with rotor 76 as by a spring 92, has an aperture 94 formed therein as to permit continuous communication of passage 82 with branch conduit means 96. Conduit means 98, formed in housing 72, communicates with conduit means 68 and with chamber 74 as by conduit portion 100 and calibrated restriction means 102.

A muscles valve assembly 104 comprised of a housing portion 106 has a chamber 108 formed therein which is in continuous communication with branch conduit means 110. An inlet 112, communicating with conduit means 98 as via interconnecting conduit means 114, is in controlled communication with chamber 108 by the action of a generally cylindrical valve 116 resiliently urged toward the closing direction as by a spring 118.

Branch conduit 96 communicates with conduit 110 which leads to conduit means 120 having one end in communication with the inlet 122 of a relief valve assembly 124 which may be comprised of housing means 126 having a chamber 128 formed therein and containing spring means 130 which serves to urge a relief valve 132 toward its illustrated closed position. When it occurs that valve 132 is suffiently moved to the right, generally radially formed ports 134 complete communication between chamber 128 and a medially disposed axially extending passage 136 which is in communication with inlet conduit portion 122. A conduit 138 serves to complete communication as between chamber 128 of relief valve assembly 124 and chamber 46 of the inlet pressure regulator assembly 24 (FIG. 3) while a second conduit 140, also in communication with chamber 128, leads to a metering pressure head regulator assembly 142 shown in FIG. 2.

The regulator assembly 142 is illustrated as comprising housing means including housing sections 144, 146 and 148 with housing sections 144 and 146 cooperating to peripherally retain therebetween a pressure responsive diaphragm 150 so as to thereby define chambers 152 and 154 on opposite sides thereof, while housing sections 146 and 148 cooperate to peripherally retain therebetween a second pressure responsive diaphragm 156 so as to thereby define chambers 158 and 160 on opposite sides thereof.

A sleeve-like member 162, provided with a plurality of radially directed ports 164, is suitably fixedly secured within housing section 144 in a manner so as to have the inner passage 166 of sleeve 162 in communication with conduit 120 while ports 164 are in communication with an annular chamber 168 formed within housing section 144. As can be seen, conduit means 120 also communicates directly with chamber 152.

A generally tubular axially movable valving member 170 is slideably received within sleeve 162. When, as will become evident, valve member 170 is sufficiently moved to the right, the end 174 thereof will uncover ports 164 of sleeve 162 and permit such ports to complete communication between conduit 120 and conduit 140 leading to the relief valve assembly 124.

As can be seen, the right end of valve 170 is fixedly secured to, as by opposed diaphragm plates, to diaphragm 150 and is urged toward the right by resilient means in the form of a spring 176 situated generally within chamber 152.

Motion or force transmitting means in the form of a rod 178 sealingly slideably received through a wall of housing section 146 operatively abutingly engages, at one end, valve member 170 and, at an other end, a member 180 operatively secured to and carried by diaphragm 156. A spring 182, situated against an adjustable spring seat 184, is contained generally within chamber 160 and urges diaphragm 156 to the left.

Chamber 160 connumicates with one end of conduit means 186 leading to means generally sensitive to engine compressor discharge pressure; chamber 158 is vented to the ambient atmosphere via conduit or port means 188; and chamber 154 communicates via conduit means 190 with conduit means 192 downstream of variable restriction means comprising a portion of an assembly 194 generally sensitive and responsive to the inlet temperature of the engine burner.

Assembly 194 is shown as being comprised of housing means 196 having a chamber 198 with a valve orifice plate 200 held against one wall thereof as to define an orifice 201 for communicating between chamber 198 and a second passage or chamber 192. An axially adjustable and slideable valve member 202 having a valving surface 203 is threadably secured to an axially slideable rod 204 the other end of which is secured to a thermally responsive member 207 which, in turn, is secured via member 205 to a second thermally responsive member 206. The rates of expansion of members 206 and 207 are different from each other and are such as to cause valving surface 203 to more nearly close orifice 201 as the burner inlet temperature increases. Thermal elements 206 and 207 are, of course, placed as to be exposed to the air at the inlet of burner 214 as to respond thereto. A suitable perforated protective shroud 208 may be provided about such thermal elements 206 and 207.

As indicated, a spring 209 normally urges rod 204 and valving member 202 in a direction tending to reduce the effective flow area of orifice 201, while a second spring 210 resiliently holds a minimum pressure pressurizing valve 211 seated as to force the initial fuel flow to pass through the calibrated restriction passage 213 while, when normal fuel flow to the engine is attained, permitting valve 211 to move to the left and thereby opening additional passages 215 for the flow of fuel therethrough.

Referring to both FIGS. 1 and 2, it can be seen that conduit means 110 communicates with a vertically depicted conduit means 234 the upper end of which is shown in FIG. 1 communicating with an inlet 236 of a housing section 238 of a main metering valve assembly 240.

The main metering valve assembly 240, as shown in FIG. 1, is illustrated as being comprised of housing means including housing sections 238 and 242 which cooperate to peripherally retain therebetween a pressure responsive diaphragm 244 which, in turn, is suitably fixedly secured to a valving member 246, slideably received and positioned within a cylindrical guide portion 248, and defines chambers 250 and 252. Chamber 252, of course, communicates with inlet 236 as well as a metering outlet orifice 254, while chamber 250 communicates with chamber 74 of the speed sense means 70 (FIG. 2) as via conduit means 256 and 258. Restriction means 260 is preferably provided as a damping means.

Orifice 254, which communicates with an inlet 255 of assembly 194 as through an outlet 262 and conduit means 264, cooperates with end 266 of the variably positionable metering valve 246 to determine a first effective metering orifice area. That is, the more valve member 246 moves to the right, the more nearly the effective flow area through orifice 254 is reduced. An axially positionable abutment member 268 provides a stop against which the end 266 of valve 246 may at times abut thereby enabling the manual adjustment of the maximum degree to which the flow area through orifice 254 may be reduced and consequently establish an assured minimum flow therethrough.

A rotatable shaft 270, journalled in housing section 238, has a cam 272 fixedly secured thereto for rotation therewith. The cam 272 is adapted for engagement with a cam-follower portion 274 of a lever 276 which has one end pivotally anchored, as to a pin 278 carried by the housing section 238, and an other end 280 of a fork-like or yoke-like configuration extending generally about the exterior of the cylindrical guide 248.

The forked end 280 of lever 276 abuts against the end of a collar-like spring seat 282 which serves to contain a spring 284 between itself and the diaphragm cup 286 of diaphragm 244. Generally, as shaft 270 and cam 272 are rotated in a direction cuasing lever end 284 to swing generally to the left, spring seat 282 moves spring 284 and, through diaphragm plate 286, metering valve 246 to the left until such time as manually adjustable abutment 288 is engaged after which any further movement of lever fork portion 280 and spring seat 282 results in the compression of spring 284 thereby creating an increased pre-load in the spring 284. An additional manually axially adjustable abutment member 290 may be set as to thereby provide a stop against which lever 276 may act in order to thereby establish a minimum rate of fuel flow through the orifice 254 during conditions of idle engine operation.

As also shown in FIG. 1, shaft 270 has a lever 292 suitably secured thereto for free rotation relative thereto. Lever 292 is provided with a first arm portion 294 which through linkage means 296, 298 and bellcrank means 300 is operatively connected as to a vehicle operator's foot controlled pedal or lever 302 pivotally mounted as at 304. A second arm portion 306 has a pin member 308 secured thereto and passing therethrough as to extend into a slot 310 formed in a second lever 313 which is suitably fixedly secured to shaft 270 for rotation therewith. In addition to pin 308 and slot 310 levers 292 and 313 are operatively interconnected as by a spring 314. A fixed pivot 316 pivotally supports a lever 318 having one end provided with an adjustable abutment 320 adapted to at times operatively engage and position a related engine priority valve member 312. The other end of lever 318 constitutes a cam follower which operatively engages suitably contoured cam surfaces 321 and 322 provided or carried as by angularly adjustably positionable means 291 and 293 secured to lever 292. A main return spring 324 having one end operatively connected to lever means 292 as by being engaged with pin 308, has its other end anchored to related fixed anchor means 326. Further, adjustably positionable fixed stops or abutments 328 and 330 are adapted to provide for abutting engagement with lever arm portion 329 of lever 313 to thereby respectively determine what may be referred to as a maximum engine speed position and an idle engine operating condition.

Referring now to FIG. 3, a vehicular transmission assembly 332 having an input shaft 334 and an output shaft 336 is shown provided with suitable control means 338 operatively connected as by conduit means 340 to a transmission actuator valve assembly 342 (FIG. 2) which is operatively coupled to a related control means 344. The output shaft 336 is shown coupled to, for example, the ground-engaging drive wheels 346 of a related vehicle.

The transmission 332 is preferably of the type which has the ability, as is well known in the art, to provide variable speed and torque therethrough. One such type of transmission employs a fluid-type coupling in the drive train with, for example, variably positionable guide vanes in the fluid coupling for varying the torque transmitted therethrough. For purposes of discussion, it will be assumed that transmission 332 is so provided with a fluid coupling in which guide vanes are variably and adjustably positionable and that control means 338 is effective for causing such variable adjustment of the guide vanes.

Referring to FIG. 2, it can be seen that control means 344, among other things, comprises assemblies 348, 350 and 352.

Referring to such in greater detail, it can be seen that assembly 348 comprises housing sections 354, 356 and 358 with sections 354 and 356 generally containing therebetween a screen member 360 with such screen permitting substantially unrestricted flow from one side thereof or area 362 to the other side thereof or area 364. Suitable sealing means, not shown but well known in the art, may be provided as to prevent any leakage out of such areas 362 and 364 generally between housing sections 354 and 356 and screen 360. As will become apparent, screen 360 does have the capability of undergoing deflection. A valving member 366, suitably secured to screen 360 is urged into sealing engagement with a portion of housing section 354, as by spring means 368, in order to thereby prevent communication as between chamber-like area 362 and an otherwise open end of a conduit 370. An inlet 372, formed in housing section 354, communicates with a source 226 of compressor discharge pressure as via conduit means 374.

Housing sections 356 and 358 also combine to peripherally retain a pressure responsive diaphragm 376 therebetween as to define chambers 378 and 380 at opposite sides thereof with chamber 378 communicating as via passage 382 with conduit means 384 leading from chamber-like area 364 while chamber 380 communicates with the ambient atmosphere as by conduit means 386, 388 and 390. A spring 392 normally urges diaphragm 376 and a valving member 394, suitably secured thereto and having valving portions 396 and 398, to the left. As can be seen, valving member 394 extends through sized passage means 400 which communicates generally between conduit 384 and a conduit 402 having a calibrated restriction 404 therein. As indicated, suitable adjustable stop members 406 and 408 may be provided.

Assembly 350 is illustrated as comprising housing sections 410 and 412 which cooperatively peripherally retain therebetween a pressure responsive diaphragm member 414 as to define at opposite sides thereof chambers 416 and 418 with chamber 416 communicating with conduits 420 and 402 as by conduit means 422. A valving member 424, slideably received in housing section 410, has an upper valving portion 426 adapted for controlling communication as between a passage 428 and a chamber 430 while the lower disposed body portion 432 is operatively connected to a moveable spring seat 434 resiliently urged, as by a spring 436, into operative abutting engagement with a diaphragm plate 438 carried by diaphragm 414. A spring 440 situated in chamber 418 urges the diaphragm 414 and plate 438 upwardly into such operative abutting engagement with valve member 424. A suitable adjustable spring seat may be provided as at 442 while an adjustable stop or abutment member may be provided as at 444. As can be seen, chamber 430 communicates with conduit means 390, which contains calibrated restriction means 446; passage 428 communicates with chamber-like area 364 of assembly 348 via conduit means 448; while chamber 418 communicates with conduit means 450 leading to assembly 352.

Assembly 352 is illustrated as comprising housing sections 452, 454, and 456 with sections 452 and 454 combining to peripherally retain therebetween a pressure responsive diaphragm 458 which is operatively connected, via an intermediate member 460, to a second diaphragm 462 which is peripherally retained by housing sections 454 and 456. In such an arrangement, chambers 464, 466 and 468 are defined at opposite sides of such diaphragms 458 and 462.

As spring 470 urges diaphragms 458 and 462 along with a valving member 472 toward seated engagement with a variably adjustable valve seat member 474 having a passage 476 formed therethrough and communicating with conduit means 478 leading to a relatively low pressure hydraulic reservoir or sump 480. Chamber 468, aside from communicating with chamber 418 via conduit means 450, also communicates with conduit means 482 leading to the transmission control valve assembly 342. Chamber 464 communicates, as by conduit means 484 with a source 486 of total air pressure at the inlet of the engine 12, while intermediate chamber 466 communicates with a source 488 of static air pressure at the inlet of the engine 12 as by conduit means 490.

Transmission control valve assembly 342 is illustrated as comprising housing sections 492 and 494 cooperating to peripherally retain a pressure responsive diaphragm 496 therebetween so as to define chambers 498 and 500 on opposite sides thereof. A spring 502, operatively engaging a diaphragm plate 504 of diaphragm 496, resiliently urges the diaphragm 496 downwardly against a spooltype valve member 506 slideably received within a sleeve valve guide 508 fixedly secured within housing section 494. A lower disposed spring 510 urges the valving member 506 upwardly against diaphragm 496.

A plurality of radially directed ports 512, formed in sleeve 508, serve to complete communication as between the passage 514 slideably containing valving member 506 and conduit means 516 leading to conduit means 478 and low pressure sump. A second plurality of ports 518 serve to complete communication as between a portion of passage 514 and conduit means 520 leading to pumping means 522 for supplying a relatively high substantially constant hydraulic pressure. A third plurality of ports 524 are controlled by valve portion 526 of valving member 506 as to selectively complete communication between either the relatively low or relatively high hydraulic pressure within passage 514 and conduit means 340 leading to the transmission control means 338 (FIG. 3).

As can be seen, the inlet conduit 520 also communicates with conduit means 482 as by a conduit 528 including calibrated restriction means 530. An adjustable spring seat may be provided as at 532, and chamber 498, generally containing spring 502, communicates via conduit means 534 with conduit 402 as at a point upstream of restriction means 404. As shown at 536, conduit means 370 is also placed in communication with conduit 534.

The transmission priority valve assembly 538 (FIG. 1) is shown as being comprised of housing means 540 having a chamber 542 formed therein which openly communicates with one end of conduit 388 and also restrictively communicates with conduit 420 as by means of a contoured valving portion 546 of valve member 312 coacting with an orifice 548. Spring means 550 situated as within chamber 542 urges valve member 312 upwardly and away from the cooperating orifice 548.

FIG. 1 also illustrates a compressor inlet air temperature sensor assembly 552 (also diagrammatically depicted at 552a within the schematically illustrated engine assembly 12) which may be comprised of body or housing sections 554 and 556 combining to define a chamber 558 which is vented to the atmosphere as at 560 and in communication with conduit 420 via conduit means 562 and orifice 564. A valve guide portion, about which is located a spring 566, slideably contains the shank of a valve member 568 having a valving portion 570 adapted to coact with orifice 564. The other end of valve member 568 has operatively secured thereto, as by a screw 572, a plurality of stacked dishlike thermostatic members 574, 576, 578 and 580 which, depending on the temperature experienced will either become more flattened or more dished and, consequently, by reacting against a portion of housing 556, cause valve member 568 to respectively move closer to or further away from orifice 564 thereby increasing or decreasing the restrictive effect to flow through orifice 564. A suitably perforated cuplike guard 582 may be provided to protect the thermostatic means.

In the preferred embodiment a solenoid operated over temperature responsive valve assembly 584 (FIG. 2) is preferably provided as to have passage means 586, formed within housing 588, in communication with conduits 562 and 420. A solenoid assembly 590 controls the position of a valving member 592 carried thereby so as to at times either terminate or complete communication as between passage 586 and a chamber 594 via calibrated orifice 596. An electrical conductor 598, for actuating the solenoid 590, is operatively connected to suitable related start sequence logic means 600 (FIG. 3).

Also, as shown in FIG. 1, pressure responsive switching means 602 are preferably provided and, as illustrated, may be comprised of electrically non-conductive housing means 604 and 606 which cooperate to peripherally retain therebetween a pressure responsive wall member 608 which, for ease of illustration and description, may be described as being electrically conductive. A chamber 610 formed on one side of wall 608 communicates as between conduit means 256 and 258 while chamber 612, on the other side of wall 608, communicates with conduit means 234 as by conduit means 614.

Adjustably positionable fixed contact type terminals 616 and 618, provided and placed in general juxtaposed relationship to a moveable contact 620 carried by the wall member 608, are respectively electrically connected as via conductor means 622 and 624 to the control means 600. An electrically conductive spring 626 situated generally in chamber 612 and in conductive engagement with wall 608 is also in electrically conductive engagement with a portion of a third terminal 628 which, in turn, is electrically connected as via 630 to the control 600. Spring 626, of course, normally biases moveable wall 608 toward chamber 610 and the contact of terminal 616 which biasing may be generally modified or offset as by a second spring within chamber 610.

Referring now to the remaining portions of the schematically represented engine 12, it can be seen that it is of the solid shaft type wherein the compressor turbine and power turbine is one and the same turbine wheel 632 connected by solid shafting means 634 to the compressor 636 so that there is no degree of free relative rotation therebeteen. Suitable gear box means 638 may be employed for providing speed motion transmitting means 640 to the shaft 64 of FIG. 3.

Generally, air flow through the engine is depicted by the lines with arrows provided thereon to indicate generally that the air entering the compressor is discharged passing through compressor discharge sensing means 226 and a heat exchanger or regenerator 642 and then, through an area 644 for receiving the heat sensing portion of assembly 194, to the combustion chamber or burner 214 from where the hot expanding gases pass through stator means 646 and the turbine wheel 632 thereby driving the wheel 632 as well as the compressor 636. In the main, the remaining work is transmitted as via shaft 634 to the input shaft 334 of transmission assembly 332 (FIG. 3). Instead of exhausting the gases directly to atmosphere, such are directed to the hot side of the regeneraor 642 to thereby recover heat energy and supply such recovered heat to the air passing through the cold side of the regenerator. After such hot gases complete their passage through the regenerator they are exhausted to the atmosphere as by suitable conduit means 646 formed in housing 648. As shown, the burner 214 may be interconnected to the metered fuel outlet 650 as by conduit means 652 and serially situated cooperating valve means 654 which may comprise a master electrically operated shutdown valve.

OPERATION OF INVENTION

Fuel at a pressure $P_1$ is supplied by pump means 14 (FIG. 3) to chamber 38 from where the pressure is also applied to chamber 32 and diaphragm 30. The fuel passing around throttling valve 41 is reduced in pressure to a value of $P_2$ which, in turn, is communicated to the inlet of pump 52 and to chamber 128 of valve assembly 124 as well as to chamber 168 of metering pressure head regulator assembly 142 (FIG. 2).

The rotation of pump assembly 52 (FIG. 3) in turn causes the fuel to be increased to a pressure $P_3$ as within passage means 98 and, upon passing through muscles valve assembly 104 subsequently is reduced to a pressure $P_4$ as within conduit means 110, 96, 120 and 234. Conduit 234 leads to the governor valve assembly 240 (FIG. 1) while conduit 120 communicates between inlet 122 of relief valve assembly 124 and the metering head regulator 142 (FIG. 2). As is apparent, whenever pressure $P_4$ should exceed a maximum value, valving member 132 of relief valve assembly 124 is moved to the right against spring 130 thereby venting or bleeding, via 134, such excess pressure to the low pressure $P_2$ of chamber 128 and conduit 138.

The value of pressure $P_5$ within speed sense means 70 is a value generally dependent on the speed of rotation of rotor 76 and, as its limits, it would have the value of pressure $P_3$ at its upper magnitude limit and pressure $P_4$ on its lower magnitude limit. That is, rotation of rotor 76 causes, by centrifugal force, valve 86 to tend to move radially outwardly and such tendency to move outwardly is overcome or resisted by the value of the pressure of fuel within chamber 74. As will become apparent, valve 86, during transient operating conditions of increasing power demands, will remain generally in the position illustrated effectively terminating communication through conduit 84 as between chamber 74 and passage 82 until the speed of pump means 52 has increased sufficiently to cause pressure $P_3$ to increase to a new value which will result in valve 86 being moved radially inwardly.

Assuming the engine is operating at a steady state condition, some flow will be occurring from chamber 74 through passage 84 and into passage 82 thereby resulting in a stabilized pressure differential of $P_5 - P_4$ which is applied across diaphragm 244 of governor vlave assembly 240 (FIG. 1). Such pressure differential is suficient ot maintain metering valve 246 in a particular relationship with respect to orifice 254 thereby permitting a particular rate of flow of fuel therethrough dependent on the pressure differential of $P_4 - P_6$ thereacross. Depending on the temperature of the engine burner inlet variable restriction means defined by orifice 201 and valve portion 203 will cause the fuel to experience a pressure drop of $P_6 - P_7$ thereacross and such pressure $P_7$ is communicated to chamber 154 of metering head regulator 142 (FIG. 2) where it acts against diaphragm 150 which has its other side exposed to pressure $P_4$. Accordingly, it can be seen that the actual metering is determined by an effective metering orifice size, which is comprised of metering orifice 254, of governor valve assembly 240, and variably restricted orifice 201 of temperature compensator 194, and a pressure differential which is actually determined by $P_4 - P_7$. Without at this time considering the effect of the compressor discharge pressure on the overall system, it can be seen that generally valve 174 of the metering head regulator assembly 142 (FIG. 2) will, by axial movement, cause ports 164 to be opened and/or closed in order to thereby modulate the value of pressure $P_4$ so as to thereby maintain a desired value of pressure differential $P_4 - P_7$.

As can be seen in both FIGS. 1 and 2, compressor discharge pressure (CDP) at a magnitude $P_a$ sensed as at 226 of engine 12 is supplied via conduit means 374 to assembly 344 (FIG. 2). As such air pressure flows through passage 428, regulated by valve 426, of assembly 350, a pressure drop is realized, due to the flow permitted by calibrated restriction means 446, resulting in a modified pressure signal of $P_{t4}$ being transmitted via conduit means 390 and 186 to chamber 160 of metering head regulator 142 (FIG. 2). Therefore, it should be apparent that as the value of magnitude of $P_{t4}$ increases diaphragm 156 through force transmitting means 178 will exert an increased force against valve member 174 so as to at least tend to prevent communication as between passage 120 and conduit means 140 through ports 164. In the main, $P_{t4}$ will experience such increases in magnitude during increases in engine speed as may occur in consequence to requests for increase in engine power.

If the engine is operating at a steady state condition and an increase in power is desired or required, the pedal or power lever 302 is rotated causing levers 292 and 313 along with shaft 270 to rotate generally clockwise with the result that cam 272 urges lever 276 to move spring seat 282 to the left causing the governor valve 246 to move against stop 288 and spring 284 to be possibly compressed, depending on the degree of rotation of cam 272. Because of this the effective orifice size of orifize 254 is substantially increased thereby enabling a greater rate of fuel flow to occur therethrough and because of the increased effective flow area of orifice 254, the magnitude of pressure $P_6$ is increased resulting in an increased rate of fuel flow through the vaiable restriction means 201 and 203 of assembly 194.

Because of the increased rate of fuel flow to the engine 12, the engine speed starts to increase causing an increase in the speed signal, N, as well as an increase in $P_{t1}$.

During such engine acceleration, governor valve 246 (FIG. 1) will be held open while the pressure differential of $P_4 - P_7$ will be maintained and modulated by the metering regulator assembly 142 as previously described. Because of such increasing engine speed, speed sense means will increase the magnitude of not only $P_5$ but alos $P_4$ so as to have the differential therebetween increase in an exponential relationship to increase in speed. Generally such increases will continue until the value of $P_5$ within governor chamber 250 is sufficient to overcome the combined resistance of the force of spring 284 and pressure $P_4$ (the magnitude of which is influenced by the downstream engine pressure, governor valve 246 and assembly 194) so as to return governor valve 246 to the right to its then proper position to maintain the required fuel flow. Upon this occurring, the value of $P_4$ has increased sufficiently to again place valve member 174 of pressure head regulator 142 (FIG. 2) into the steady state modulating mode of operation.

From the preceding it should be apparent that: (1) as speed N either increases or decreases the relative values of $P_5$ and $P_4$ will be effected causing the governor valve 246 to respond accordingly as well as having the modulating valve 174 bypass more or less fuel; (2) as burner inlet temperature increases or decreases the effective flow area of variable restriction means 201 and 203 decreases or increases thereby correspondingly permitting an increase or decrease in the rate of metered fuel flow; and (3) as compressor discharge pressure increases, the value of $P_{t4}$ will generally increase thereby further restricting or preventing, in accordance with a schedule determined generally by the constants of the system, the degree of fuel being bypassed by modulating valve 174.

In order to ahcieve engine deceleration, shaft 270 is rotated generally counter-clockwise thereby permitting spring seat 282 to move lever end 280 to the right with pressure $P_5$ in chamber 250 then being able to move governor valve 246 to a position relatively close to orifice 254 as determined, for example, by the idle abutment 290 if cam 272 is sufficiently rotated to a position corresponding to a condition of idle engine operation.

As can be seen, static inlet air pressure $P_s$ is directed from sensing means 488 of engine 12 to chamber 456 (FIG. 2) via conduit means 490. The value of $P_s$, because of the location of sensing means 414 as within a venturi-like inlet of the engine, may actually be of a magnitude less than ambient static air pressure and to that extent may be considered as a partial vacuum. In comparison, the total inlet air pressure $P_o$ (which is preferably derived at a point in the ambient air which, for practical purposes may be considered being static air) is directed from sensing means 486 of engine 12 to chamber 464 (FIG. 2) via conduit means 484 so as to thereby create a pressure differential of $P_o - P_s$ across diaphragm 458 which may be considered as a signal or indicia of weight rate or mass rate of air flow to the engine 12. The resulting force on diaphragm 458 is, of course, one urging the diaphragm downwardly. The resulting force created across diaphragm 458 is therefore a signal indicative of the actual rate of air flow to the engine 12. One of the problems, however, is that the $P_o$ and $P_s$ pressures are of a relatively low magnitude and often not directly employable for other control functions.

Therefore, chamber 468 has a hydraulic pressure $P_{h2}$ applied thereto which is the result of communication through conduit means 482, restriction means 530, and conduit means 528 which communicates with conduit means 520 being supplied with a relatively high regulated pressure $P_{h1}$ from pump means 522. As a consequence thereof, diaphragm 462 has a pressure differential thereacross of $P_{h2} - P_s$ while, as previously described diaphragm 458 has a pressure differential of $P_o - P_s$ applied thereto. Further, it can be seen that as diaphragms 462 and 458 move upwardly valving member 472 will to some degree further open the communication as between chamber 468 and passage 476 leading to the low pressure, $P_{h3}$, return conduit 478. Such opening movement of valve member 468 permits an increased rate of return flow and this coupled with the restrictive effect of restriction means 530 causes a reduction in the magnitude of pressure $P_{h2}$ so as to make it more nearly approach the lower absolute limit of pressure $P_{h3}$. Consequently, since the total actual movement of valving member 472 may be very small while the variation on the magnitude of pressure $P_{h2}$ may be substantial, assembly 352 may be considered as a high gain pressure balance apparatus functioning as an air flow transducer. The variation in the magnitude of pressure $P_{h2}$, as should be apparent, may then be considered as a signal indicative of one of the engine operating parameters, namely, the rate of air flow to the engine.

Generally, if a graph were plotted of $P_{h2} - P_s$ against $P_o - P_s$, the resulting locus of points would define a straight line with the slope thereof being determined by the respective areas of diaphragms 458 and 462 while the intercepts of such resulting plotted line would be determined by the original settings of the components thereof.

Another engine operating parameter, compressor discharge pressure (CDP) and designated as $P_{t1}$, is sensed as at 226 of the engine 12 and applied first, via conduit means 374, to chamber-like areas 362 and 364 of assembly 344 from where, as by conduit means 448, it is applied to passage 428 of assembly 350. As shown, pressure $P_{h2}$, of chamber 468 of the transducer 352, is also applied via conduit means 450 to chamber 418 on one side of diaphragm 414 while a second variable pressure $P_{t3}$ is applied to chamber 416 on the other side of diaphragm 414 as by conduit means 422 thereby creating thereacross a pressure differential of $P_{h2} - P_{t3}$. The derivation of pressure $P_{h2}$ has already been explained; however, pressure $P_{t3}$ is obtained by the coaction of two restriction means generally down stream of the inlet 372 of assembly 344.

That is, compressor discharge pressure $P_{t1}$ flows from conduit means 384 to conduit means 402 via orifice 400 which is variably restricted by valve portion 396 of valving member 394. The degree to which the flow through orifice 400 is restricted is primarily dependent upon the position of valving member 394 which, in turn, is determined by the pressure differential across diaphragm 376 created by pressure $P_{t1}$ in chamber 378 and ambient atmospheric pressure in chamber 380. Therefore, generally, the greater the magnitude of $P_{t1}$ or the lesser the ambient atmospheric pressure, the more diaphragm 376 will tend to move to the right and the greater the restrictive effect to flow through orifice means 400 with, of course, the greater drop in pressure thereacross resulting in a further reduction in the magnitude of pressure $P_{t2}$.

At this point it should be brought out that pressure $P_{t2}$ is communicated, via conduit means 534, to chamber 498 (of the transmission control valve assembly 342) on one side of diaphragm 496 on the other side of which chamber 500 is exposed to the hydraulic pressure $P_{h2}$ thereby resulting in a pressure differential of $P_{t2} - P_{h2}$ across diaphragm 496.

Referring again to assembly 344, it can be seen that a second restriction 404 causes the pressure $P_{t2}$ to again drop to some value $P_{t3}$ in conduit means 420. The magnitude of $P_{t3}$ will, of course, be dependent on, and nearly a percentage (as for example 90%) of, the magnitude of pressure $P_{t2}$ as well as the rate of flow in conduit means 420. In any event, the pressure $P_{t3}$ thusly derived is transmitted via conduit means 422 to chamber 416 of assembly 350.

It should also be pointed out that since one of the factors determining the magnitude of pressure $P_{t3}$ is its rate of flow in conduit means 420, that safety solenoid valving assembly 584, ambient temperature sensing assembly 552 (FIG. 1), priority valve assembly 538 (FIG. 1) as well as exhaust pressure of atmosphere ATM, contribute to the determination of such flow. That is, the more valve 570 (of temperature sensing assembly 552) is opened due to a decrease in sensed ambient temperature, the more priority valve member 546 is opened due to the control exercised thereover by associated linkage means, and the opening of the orifice 596 is solenoid valve means 584 will all contribute to the rate of flow of $P_{t3}$ to ambient atmosphere and therefore serve to reduce the magnitude of pressure $P_{t3}$.

In view of the preceding it can be seen that valving member 394 functions as a means for more accurately tailoring or modifying the value of a control pressure $P_{t2}$ to the requirements of the particular associated engine 12. As should be apparent, the value of magnitude of $P_{t2}$ is generally a function of $P_{t1}$ and, in the embodiment disclosed, the value of $P_{t2}$ is generally permitted to incrementally increase a lesser amount than corresponding incremental increases in $P_{t1}$. However, depending upon the particular engine characteristics, it would be just as possible to have valving member 394 provide the reverse effect during its normal operating range.

In any event, with reference to the transmission control valving assembly 342, when the value of $P_{t2}$ in chamber 466 becomes comparatively sufficiently low, valve member 506 will move upwardly thereby permitting pressure $P_{h1}$ to be communicated to conduit means 340 leading to the transmission control means 338 of FIG. 3 and in so doing cause the speed ratio as between the input shaft 334 and output shaft 336 to change in order to effectively vary the torque therebetween so as to have the output shaft 634 of engine 12 sense an increase in torque load applied thereto. This will result in the speed of the engine tending to decrease; however, the speed change is sensed as by speed sensor 70 with the resulting effect that additional metered fuel flow is provided in order to maintain the selected speed setting and engine temperature.

Referring to assembly 350, it can be seen that the magnitude of pressure $P_{t4}$ is dependent upon the magnitude of pressure $P_{t1}$ and the restrictive effect of the variably positionable valve portion 426 of valving member 424. Generally, when the magnitude of the differential between pressures $P_{t3}$ and $P_{h2}$ becomes such as to move valving member 424 upwardly, pressure $P_{t1}$ is permitted to flow from passage 428 through chamber 430 and into conduit means 186 and, in the process create a lesser pressure of $P_{t4}$ within conduit means 186 and chamber 160 of the metering head pressure regulator assembly 142. Generally, the greater the magnitude of pressure $P_{t4}$ the greater will diaphragm 156 of assembly 142 tend to close valving member 170 and thereby reduce the amount of fuel flow permitted to be bypassed from conduit 120 to conduit means 140 and 138.

Now considering certain modes of engine operation, the invention as herein disclosed provided means for enabling a limited fuel flow to the engine upon initiation of the engine start sequence but prior to actual engine cranking, which, of course, would mean zero engine speed. That is, upon initiation of the start sequence, the boost pump means supplies fuel which, by throttling valve 41, is regulated to a relatively low pressure $P_2$ (as for example, 7.0 psi.) within chamber 46 (FIG. 3) from where such fuel passes through the related fluid circuitry until it reaches chamber 192 of assembly 194 from where it must pass through calibrated passage 213 of member 211. During a very short period of flow of such zero-engine-speed fuel, the igniter within the engine causes ignition and the engine starter means is actuated to cause engine cranking during which pumping means 52 (FIG. 3) starts to provide increasing fuel flow to the engine with the regulation of such flow being achieved by the pressure head regulating assembly 142 (FIG. 2) including the bypass valve 170 which receives its back pressure $P_7$ by virtue of member 211 in assembly 194 (FIG. 1).

During conditions of engine acceleration the various components coact generally as follows. The throttle control 302 is rotated causing levers 292 and 313 and shaft 270 to rotate generally clockwise causing cam 272 to, through lever 274, move governor valve 246 to its fully opened position against stop 288 thereby permitting an increase in fuel flow to the engine. Such increase in fuel flow causes an increase in engine temperature which is reflected as an increase in CDP pressure $P_{t1}$ as well as increases in pressures $P_{t2}$, $P_{t3}$ and $P_{t4}$. In valve assembly 350, (FIG. 2) immediately prior to the initiation of engine acceleration, as during steady state operation, valve member 424 was in its uppermost position against stop 444 thereby presenting the least possible restriction to flow from passage 428 to chamber 430. Therefore, as CDP pressure $P_{t1}$ increases upon initiation of the acceleration mode, the increased magnitude of $P_{t3}$ against diaphragm 414 will move valve member 424 somewhat downwardly to thereby modulate the resulting magnitude of $P_{t4}$ which, via conduit means 186, is transmitted to chamber 160 of the pressure head regulator assembly 142. The increased, but modulated, pressure $P_{t4}$ thusly applied to diaphragm 156 results in an increased force tending to move the bypass valve member 170 toward a more nearly closed position thereby reducing the rate of flow of fuel being bypassed back to low pressure via conduits 140 and 138. That is, even though the function of assemgly 142 is to modulate bypass fuel during all conditions of engine operation, it, nevertheless, bypasses a lesser rate during conditions of engine acceleration. According, during the time that the engine is undergoing acceleration, the rate of fuel flow, across the effective flow areas of the fully opened governor valve 246 and the burner inlet temperature sensing assembly 194, is controlled by the position of bypass valve 170 which, in turn, is being determined by the modulated pressure $P_{t4}$ and CDP pressure $P_{t1}$. Since pressure $P_{t1}$ is a function of the temperature of the burner which, in turn, is a function of the rate of fuel flow, it becomes apparent that the above-described components are functioning in a closed loop manner so that only that precise rate of fuel flow will be permitted as will provide the desired optimum engine operating temperature. Moreover, should the safe operating limits of the engine, that is surge or over-temperature, be approached as determined by the relationship of $P_{t3}$ to airflow the diaphragm 414 will move downwardly causing the valve 426 to further restrict orifice 428 and reduce $P_{t4}$ to maintain engine operation within safe limits. This is the primary closed loop effect.

It should also be pointed out that at initiation of the acceleration mode, pressure $P_{t2}$ also increased and such, communicated via conduit means 534 to chamber 498 of the transmission control valve assembly 342, causes the valve member 506 to momentarily move downwardly to reduce the load on the engine 12 thereby enabling the engine to start to increase in speed more quickly. After the momentary unloading of the engine 12, the increased air flow results in a pressure differential of $P_o - P_s$ (amplified as previously described) which increases in magnitude causing hydraulic pressure $P_{h2}$ in chamber 500, of transmission valve assembly 342, to increase and return valve member 506 to its modulating condition, depending on the value $P_{t2}$ which also increases as the engine increases speed.

The above described acceleration mode continues until the speed sense 70 develops a sufficient pressure differential of $P_5 - P_4$ to cause governor valve 246 to again move to the right and again contribute to the overall fuel metering function. Because of this, generally, no further acceleration fuel flow occurs; however, regulator assembly 142 still continues to modulate and, since the magnitude of pressure $P_4$ in chamber 152 at thist time is greater than at initiation of acceleration, a greater force is experienced tending to move bypass valve 170 to the right with the result that a greater rate of fuel flow can be bypassed to low pressure return while maintaining the desired pressure drop of $P_4 - P_7$ during such resulting steady state operation. At such resulting steady state, as previously generally indicated, the magnitude of hydraulic pressure $P_{h2}$ has sufficiently increased to overcome the previously increasing force developed by the previously increasing value of $P_{t3}$ and consequently move valve member 424, of assembly 350, upwardly against its stop 444.

During deceleration the reverse is generally true in that because of the closure of governor valve 246 to its then minimum flow, the rate of fuel flow therepast is drastically diminished resulting in a decrease in burner temperature and CDP pressure $P_{t1}$. As a consequence thereof, resulting pressures $P_{t2}$, $P_{t3}$ and $P_{t4}$ are reduced. The reduction in pressure $P_{t4}$ sensed in regulator assembly 142 enables bypass valve 170 to be moved toward its maximum position so as to bypass a greater amount of fuel back to conduit means 140 and 138; the reduction in pressure $P_{t3}$ serves to assure maximum communication as between passage 428 and chamber 430 of valving assembly 350; as engine speed decreases during deceleration $P_{t1}$ will further decrease resulting in a reduction in pressure $P_{t4}$ which, in turn, results via the action of the bypass valve in a reduction in fuel flow delivered to the engine; while the reduction in pressure $P_{t2}$ sensed in chamber 498 of assembly 342 causes valve member 506 to move upwardly thereby loading the engine so as to have the engine function as a braking force during vehicular deceleration.

Now, let it be assumed that the engine is operating at idle condition and power lever 302 is as shown. In this idle position the minimum engine speed is essentially controlled by the idle stop 290 which limits the lever 276 from following the cam 272. At this time the engine temperature may be set or determined by the position of the priority valve 312 which is determined by lever 318 coacting with cam surface 322 of lever-like cam member 293. Generally, in adjusting such engine tempeature, if more temperature is desired screw 320 is adjusted upwardly relative to lever 318 so as to result in a greater bleed through orifice 548 thereby reducing the magnitude of pressure $P_{t3}$.

As the power lever 302 is slowly rotated from its idle position through approximately its first ten percent (10%) of total travel, engine temperature and power are gradually increased by gradually opening the priority valve means 312 as dictated by the controlling cam surfaces 321 and 322. Such opening of the priority valve reduces the magnitude of $P_{t3}$ and $P_{t2}$ momentarily causing the transmission actuator valve 506 to move upwardly and admit higher hydraulic pressure to the transmission control means 338. This, in turn, causes the torque converter stator angle of the transmission 332 to be changed to a lower torque multiplication thereby placing an extra load on the engine. Because of this increased load, the engine speed may tend to decrease; however, such tendency is overcome by the governor valve 246 providing an increase in the rate of fuel flow to the engine which, of course, results in a higher engine temperature, CDP pressure $P_{t1}$ and engine power output. When the power lever or throttle lever 302 reaches about 10 percent of its maximum travel, the engine burner temperature has been brought to the normal maximum allowable operating temperature which, for example, may be in the order of 2,200.0°F. Further throttle advance, in the preferred embodiment, will increase engine speed but not burner temperature.

That is, as the control pedal or lever 302 is rotated from its approximately 10 percent to its approximately 90 percent of its maximum travel, the then position of priority valve 312 is not changed because during such range the contour of cam surfaces 321, 322 would be of a constant radius. (Such contour, of course, could be any suitable contour compatible with the related engine.) This would maintain engine burner temperature at a constant value while engine speed would increase due to cam 272 placing a greater spring preload force into spring 284 of the governor valve assembly 240 as previously described.

During the last 10 percent of maximum movement of power lever means 302, lever 313 will eventually have portion 329 thereof abut against fixed stop 328. At this time, engine speed has reached a maximum speed imposed by such stop 328. However, further throttle advance after lever 313 is brought into such abutting engagement, causes lever 292 to move, against the spring 314, relative to lever 313 with the limit of such relative movement being determined as by the length of slot 310. During such period of relative movement between levers 292 and 313 the contour of cam surface 321 is such as to cause priority valve 312 to open to a further extent thereby again reducing the value of $P_{t3}$ and $P_{t2}$ and causing the transmission valve 506 to move upwardly to reduce the torque ratio through the transmission assembly 332 and thereby again place an additional load on the engine with the result that, as before, additional fuel is metered to the engine causing an increase in burner temperature and engine output power. This last ten percent of movement can be generally correlated to what is commonly referred to as a "passing mode" function in the prior art.

In view of the preceding, it can be seen generally that as the value of $P_{t3}$ and $P_{t2}$ is made to increase or decrease the transmission selector valve 506 is moved downwardly or upwardly, respectively, in order to thereby correspondingly decrease or increase the torque multiplication through the transmission assembly 332 and, in such way, by increasing or decreasing the load on the engine, maintain the temperature of the engine burner 214 at a selected optimum temperature.

The preceding is generally depicted by the graph of FIG. 4 wherein the value of compressor discharge pressure (CDP) divided by the static ambient pressure, $P_{s(amb.)}$, is plotted against the mass rate of air flow $Wa \cdot \sqrt{T}$ (wherein T is the ambient air temperature at the engine inlet) divided by the same value of static ambient pressure, $P_{s(amb.)}$. Line 660 depicts, generally, a nominal steady state curve which may represent a burner temperature of, for example, 1,900°F. Line 662 depicts a nominal acceleration or increased power curve which, for purposes of illustration may represent a burner temperature of 2,200°F., while curves 559 and 661 respectively indicate fragmentary portions of curves obtained during the "passing mode" previously described.

Lines 663, 664, 665 and 666 are merely illustrative of characteristic governor hooks or curves determined generally by the action of the governor valve 246. If it is assumed that hooks 663 and 664 respectively depict 50 percent engine speed and 60 percent engine speed, it can be seen that with the engine operating at point 667 of the steady state curve and acceleration to some point 668 is desired, by rotation of the power lever 302 burner temperature will increase from point 667 to point 669 and thereafter remain at the substantially constant temperature of the acceleration curve 662 until the governor valve 246 again reduces fuel flow, in accordance with governor hook curve 664 and burner temperature decreases until point 668 is attained at the comparatively reduced temperature of the steady state curve 660.

The curves illustrated by portions 559 and 661 depict the resulting increase in burner temperature and air flow resulting from the throttle lever 302 being moved through the last 10 percent of its maximum travel as previously described.

It should be pointed out that if, for example, 50 percent engine speed is considered to be idle engine operation that under idle conditions the engine may actually be developing excess power which would normally tend to put the associated vehicle in motion. Therefore, the invention as herein disclosed, provides means for arbitrarily, at idle engine operation, lowering the burner temperature while maintaining engine speed thereby effectively reducing the engine power output. This is accomplished by the priority valve 312 being urged most nearly closed at conditions, indicated by the throttle linkage, to be idle engine operation. The result of this is that pressure $P_{t3}$ and $P_{t2}$ increases, comparatively, and more nearly approaches the value of $P_{t1}$ thereby causing the transmission selector or control valve 506 to move downwardly in order to threby reduce the load on the engine 12. As this happens, the engine's tendency to increase in speed is offset by the bypass valve 170 and governor valve 246 responding in a manner causing an appropriate reduction in fuel flow to the engine with, of course, an attendant reduction in burner temperature. Consequently, instead of the engine operating at the temperature of point 667 of FIG. 4 during idle, it will operate at some selected lower temperature indicated at 670.

With reference to FIG. 1, two other means, namely the compressor inlet temperature sensor assembly 552 and the temperature control solenoid assembly 584 (FIG. 2) provide functions somewhat similar to the priority valve 312 with the exception that the solenoid valve assembly 584 is preferably of the "on - off" type whereby it is responsive to a predetermined engine over-temperature condition and upon sensing such condition causes valve orifice 596 to be closed by valve 592. When this happens, all of the curves, 660, 662, 661, and 559 of FIG. 4 are shifted to respective lower temperatures until the over-temperature condition is corrected. In contrast, valve assembly 570 is of the variable bleed type. However, it too, in response to sensed increase in compressor inlet temperature more nearly closes off the bleed of $P_{t3}$ to atmosphere thereby again increasing the value of $P_{t3}$ and $P_{t2}$ and causing a reduction in fuel flow in the manner previously described via transmission control valve 506.

Further, with reference to assemblies 344 and 350, it can be seen that during steady state operation valving portion 426 of valve member 424 can be considered as permitting substantially free flow through conduit means 186 applying unmodulated $P_{t4}$ to chamber 160 of metering head assembly 142 (FIG. 2). Consequently, during such periods of operation, the variations in CDP pressure $p_{t1}$ are reflected in values of $P_{t4}$ which is employed to cause bypass valve 170 to be modulated and thereby continually monitor; indirectly, the engine temperature via the agency of CDP pressure $P_{t1}$.

Figure 7:
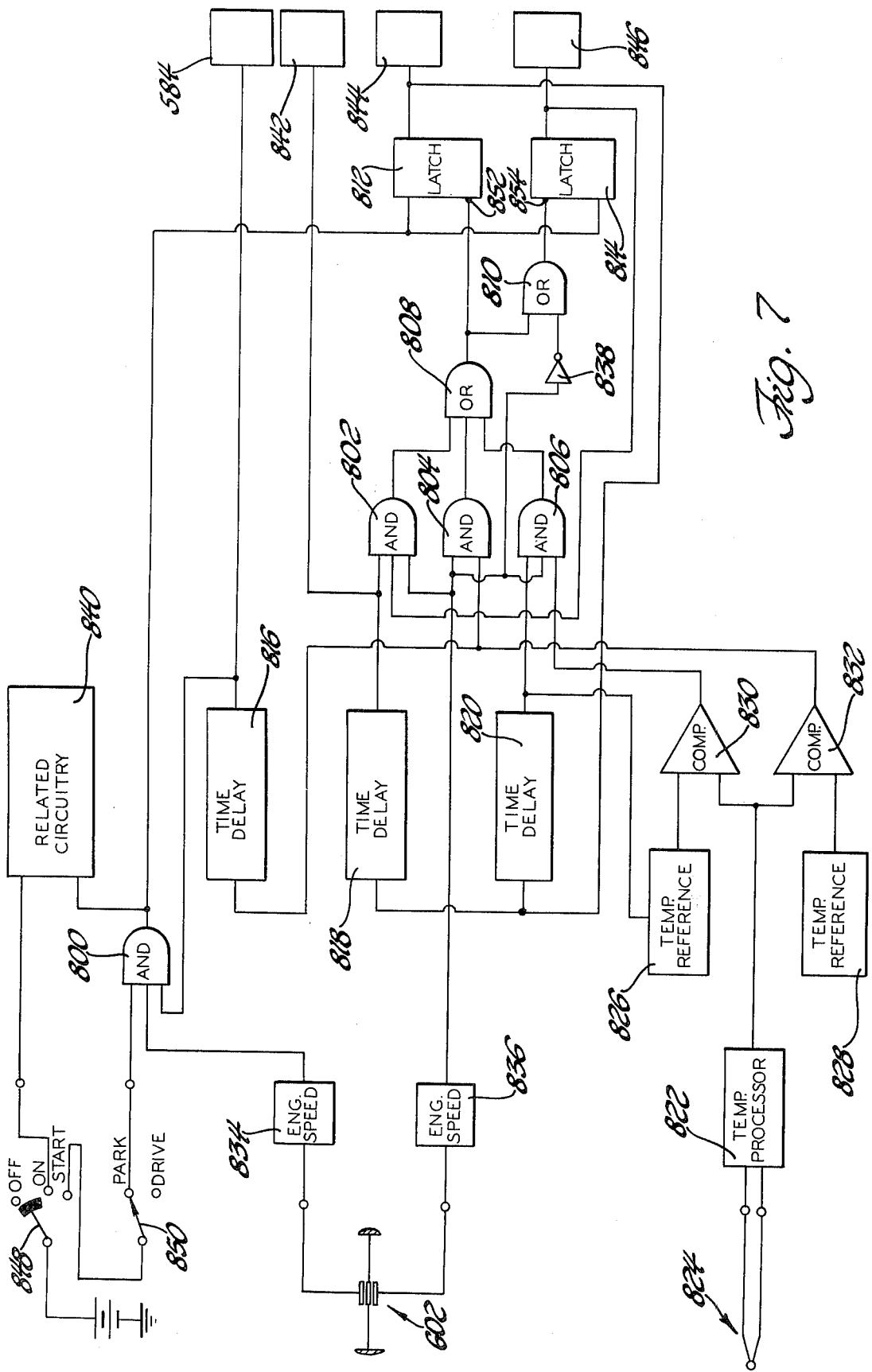
FIG. 7 is a schematic logic diagram illustrating in greater detail one of the elements shown in FIG. 3.

The speed switch assembly 602 of FIG. 1 is employed in combination with the engine start sequence logic means 600 of FIG. 3 which is shown in greater schematic detail in FIG. 7.

In FIG. 7, the logic means is illustrated as comprising a plurality of AND gates 800, 802, 804 and 806; OR gates 808 and 810; electrical latching means 812 and 814; timing means 816, 818 and 820; turbine inlet temperature sensitive signal producing means 822 and thermocouple 824 which may be within generally the turbine section of the engine 12; temperature reference means 826 and 828; comparators 830 and 832; signal producing means 834 and 836 indicative of particular selected ranges of engine speed; an inverter 838; and related associated vehicular circuitry 840.

At the right side of the logic network are, schematically illustrated, solenoid valve assembly 584 (shown also in FIG. 2); vehicular accessory means 842 such as, for example, air conditioner means driven by the engine 12; master fuel shut-off valving means 844 as may be situated within conduit means 652 of FIG. 1 leading to the engine 12; and engine starter motor solenoid means 846 for cranking the engine during starting operations.

Under normal conditions, the starting sequence would be as follows. When the manual ignition switch is moved to the "on" position the accessory means 842 will be energized; however, in order to initiate a start, the following conditions must be satisfied. That is, switch 850, indicative of transmission 332 selector lever position, must be in "park" and engine speed, as sensed by switch 602, must be less than 10 percent of maximum speed. Signal producing means 834 is responsive to such engine speeds less than 10 percent.

Start is then initiated by a momentary deflection of the ignition switch 848 to the "start" position. At such start initation the following conditions occur: (*a*) time delay means 818 functions to de-energize the accessory means 842 for, for example, 20.0 seconds so as to remove any such load from the engine; (*b*) starter motor means 846 is energized causing starter engagement with the engine 12; (*c*) the master fuel relay or valving means 844 is energized thereby switching on the flow of fuel; and the safety solenoid valving means 584 is energized opening port 596 (FIG. 2) and thereby setting the nominal control acceleration and steady state operating lines or curves to the normal mode of operation. The combustion chamber temperature is compared to a minimum allowable reference at, for example, 3.0 seconds after start initiation in order to see if ignition had occurred. Such time delay is achieved by time delay means 820 while the temperature sensed by probe 824 is compared against the minimum temperature reference means 826.

With the above normal conditions and when engine speed reaches, for example, 45 percent of its maximum speed, (as sensed by switch means 602 and indicated by engine speed signal means 836 with comparable means 834 now being switched to its other mode) the starter means 846 is de-energized and the following normal run conditions are established: (*a*) the solenoid valve means 584 is "on;" (*b*) the master fuel relay or valve means 844 is "on;" (*c*) the starter motor means (which, of course, comprises its associated relay means) 846 is "off;" and the vehicle accessory means (which, of course, also comprises its associated relay means) 842 is "on".

However, the above described normal start sequence will be aborted if any of the following conditions should occur. If after supplying fuel to the combustion chamber of the engine 12, for example, for 3.0 seconds there is absence of or lack of sufficient ignition, the start sequence is aborted. The 3.0 seconds delay is achieved by time delay means 820 and a minimum temperature of, for example, 1,400°F. is employed as a reference to indicate that proper "lite-off" of the combustion chamber has occurred. The temperature of the combustor is sensed, of course, by probe 824 and compared to the minimum temperature reference of means 826, as at 1,400°F., to indicate whether the minimum prescribed temperature has been attained. If the combustor temperature is below minimum limits comparator 830 then, through the action of AND gate 806 and OR gate 808 applies a signal to the "reset-off" terminal 852 of latch means 812 shutting-off the master fuel relay means 844 and, at the same time, through AND gate 806, OR gate 808 and OR gate 810 applies a signal to the "reset-off" terminal 854 or latch means 814 de-energizing starter means 846.

If overcrank has occurred, that is, engine speed has not reached the assumed selected speed of 45 percent of its maximum speed within, for example, 20.0 seconds of start initiation, the start sequence is again aborted. The time delay is accomplished by time delay means 818. Since at this condition engine speed range signal producing means 836 is providing an output signal which is compatible with the output signal of time delay means 818, such time delay signal through AND gate 802 and OR gates 808 and 810 will be applied to the "reset-off" terminals 852 and 854 of latch means 812 and 814 thereby de-energizing the master fuel relay 844 and starter motor means 846.

If an over-temperature condition occurrs before the engine speed has reached the assumed 45 percent of its maximum speed the start sequence will be aborted. For purposes of illustration, it is assumed that a sensed temperature in excess of 2,000°F. indicates such overtemperature. At this time the temperature is, of course, sensed by probe 824 and compared against the temperature reference means 828 which establishes the assumed 2,000°F. The signal produced by the comparator means 832 is compatible with the signal being produced by speed signal producing means 836 and therefore through AND gate 806 and OR gates 808 and 810 a signal is applied to the "reset-off" terminals 852 and 854 of latching means 812 and 814 with the resulting de-energization of means 844 and 846 as previously described.

If "lite-off" actually occurs but is followed by a "flame-out" thereby reducing the combustor temperature to, for example, 1,200°F. or less and this low temperature exists while the engine speed is less than the assumed 45 percent and at an assumed time of 3.0 seconds after start initiation, the start sequence will again be aborted. This condition is again established by the time delay means 820 and temperature reference means 826 providing an output to the comparator means 830 which also receives a temperature signal from probe 824. Similarly to the "no lite-off" condition previously described, the comparator 830 through the agency of AND gate 806 and OR gates 808 and 810 again applies a signal to the "reset-off" terminals 852 and 854 of latch means 812 and 814 with the same result as previously described.

Obviously, the start sequence is also aborted should the ignition switch 848 be moved to the "off" position.

As part of the safety included within the overall turbine control system, solenoid valve assembly 584 (see also FIG. 2) is energized to an open condition at start initiation thereby establishing the nominal acceleration and steady state operating lines or curves to the normal mode of operation. However, if an over-temperature condition should exist (sensed by probe 824 and compares to temperature reference means 832) for a time span of, for example, 3.0 seconds, as determined by time delay means 816, the signal from the time delay means will cause de-energization of solenoid valve means 584 resulting in closure of orifice 596 (FIG. 2) and the consequent lowering of the nominal acceleration and steady state operating lines or curves (reduction of rate fuel flow). Although the solenoid assembly 584, once de-energized, will not cause an abort condition, it will inhibit a re-start.

In order to reset the solenoid valve assembly 584 and re-initiate the start sequence, the entire system must be manually reset which is accomplished by returning the ignition switch 848 to its "off" position.

In view of the preceding, it can be seen that the invention, in at least one of its aspects, provides a turbine engine control system which automatically monitors certain parameters during engine starting to assure the attainment of only normal accepted conditions while automatically aborting engine starting should certain established parameters not be met.

During normal operation, the system functions in a generally closed loop fashion to maintain selected optimum engine operating temperatures as by, when necessary, increasing or decreasing the load sensed by the engine while still providing for increased or decreased fuel flows, if necessary, to provide for increased or decreased engine speeds.

For example, referring to the graph of FIG. 5 the maximum and deceleration fuel limits are illustrated at 900 and 902 (such being determined by plotting fuel flow to the engine against CDP pressure $P_{t1}$). Such limits may be considered as being those which the overall fuel control system 10 is capable of delivering were it not for the overrriding limiting and monitoring effect of the other components operating in closed loop control.

Such interrelationship is illustrated graphically (in somewhat exaggerated form) in FIG. 6 wherein the fuel flow is plotted against engine speed, N. In FIG. 6, the absolute maximum fuel limit curve 900' corresponds to curve 900 of FIG. 5 while the minimum deceleration curve 902' corresponds to curve 902 of FIG. 5. Also, depicted by the generally shaded portion 904, is the region where the system is operating as a closed loop control so as to in fact establish a lower maximum fuel limit, as depicted by curve 906.

In view of the preceding, the invention provides a turbine control system which has certain portions thereof operating, during certain operating conditions, in a scheduling mode of operation while at other conditions of operation other interrelated portions operate in a closed loop mode as to closely meter the fuel flow to the engine in order to either maintain a selected desired optimum engine operating temperature or to insure surge free operation for such conditions. To this end, it should also be brought out that during steady state operation, if additional power is required to maintain steady state operation, such is initiated by the movement of the throttle control or power lever 302 and such movement can be considered as a part in the overall feed-back for achieving closed loop operation.

In addition to the preceding, it can be seen that assembly 344 (FIG. 2) along with its related components provides a fail-safe structure. That is, generally, as the value of $P_{t2}$ should decrease, some related means downstream thereof react in a way requiring an increase in fuel flow. If the screen 360, which is provided to prevent foreign matter from entering the system, should start to become clogged, a substantial pressure drop could occur thereacross with the result that $P_{t2}$ would become an inaccurate signal causing increased fuel flow when in fact no such increased fuel flow would be required. Therefore the provision of valve means 366 operated by the deflection of the screen 360 (such deflection occurring in response to the un-wanted pressure differential thereacross) opens conduit means 370 and effectively applies the higher pressure (or some significant portion thereof) within the chamber-area 362 to the same means downstream of pressure $P_{t2}$ which, in turn, causes such means to reduce fuel flow instead of increasing it. The engine is thereby protected against over-temperature operation and the vehicle operator, upon noticing, over a period of time, a reduction in the power output of the engine will have the system checked. In view of this, it can be seen that such a valving arrangement becomes significant anywhere a filter means is required through which flows an actuating fluid with such fluid being employed to develop an actuating pressure to a related device downstream thereof.

Also, the compressor inlet temperature sensing means 552 is quite unique in that it automatically functions to alter the rate of fuel flow to the engine depending on the ambient compressor inlet temperature. Since turbine engines are sensitive to inlet temperature the provision of means 552 enables the entire fuel control system to continue operation generally independently of ambient temperature while means 552 provides an overriding effect to either increase or decrease the metering rate in accordance with variations, in ambient temperature. As can be seen, generally, CDP pressure is directed to first restriction means defined as by, for example, means 344, which in turn, applies an output signal to the remaining fuel control means for determining the required rate of fuel flow. From such first restriction means, part of the output signal is bled away by the action of the temperature sensitive means 552 and the degree of such bleed in turn effects the ultimate magnitude of such output signal.

Although the invention has been disclosed employing a transmission assembly 332 the invention is not so limited in that other means suitable for varying the load of the engine may be employed. For example, suitable braking or clutching means may be employed as, for example, interconnecting the compressor and power turbine, or other means such as variably positionable turbine nozzle means may be employed. Any of such means may be employed. Any of such means would be operatively connected to suitable servo means such as valving assembly 342 in order to achieve engine loading and unloading consistent with the disclosure made herein.

Although only one preferred embodiment of the invention has been disclosed and described, it is apparent that other embodiments and modifications of the invention are possible within the scope of the appended claims.

I claim:

1. Fail safe apparatus, comprising house means, chamber means defined at least partly by said housing means, inlet means for admitting a relatively high pressure fluid into said chamber means, first outlet means including a first restriction for directing said fluid from said chamber means to associated means to be acted upon by said fluid in accordance with the magnitude of said pressure of said fluid, filter means situated generally in the path of flow of said fluid, second outlet means having a lesser restriction than said first restriction of said first outlet means for at times directing said fluid from said chamber means to the associated means, and valving means for controlling the communication between said second outlet means and said chamber means, said valving means being operatively controlled by the deflection experienced by said filter means due to a pressure differential across said filter means generated by said fluid flowing through said filter means and an increasing restrictive effect to flow through said filter means created by clogging of said filter means by particles of dirt, whereby clogging of said filter in the absence of said valve would produce an undetectable, lower-than-normal pressure having an undesired effect on the associated means, as compared to said filter not being clogged, but whereby, upon said filter becoming clogged sufficiently to cause said valve to open, a higher-than-normal pressure is produced and said second outlet means, said higher-than-normal pressure being detectable and useable to have a desired effect on the associated means.

2. Fail safe apparatus according to claim 1 wherein said filter means is situtated within said chamber means so as to define a generally movable wall-like structure wih first and second chamber-like portions on responsive sides thereof.

3. Fail safe apparatus according to claim 1 and further comprising resilient means for resiliently resisting said deflection of said filter means.

4. Fail safe apparatus according to claim 1 wherein said filter means is situated within said chamber means so as to define a generally movable wall-like structure with first and second chamber-like portions on respective sides thereof, and further comprising resilient means for resiliently resisting said deflection of said filter means, said resilient means being situated within one of said chamber-like portions and operatively connected to said filter means.

5. Fail safe apparatus according to claim 1 wherein said inlet means communicates with said chamber means upstream of said filter means, wherein said first outlet means communicates with said chamber means downstream of said filter means, and wherein said second outlet means communicates with said chamber means upstream of said filter means.

6. Fail safe apparatus according to claim 1 wherein said chamber means comprises passage means for the flow therethrough of said fluid.

7. Fail safe apparatus according to claim 6 wherein said filter means comprises a relatively flexible wall-like member with a plurality of flow-through passages formed therethrough, said flexible wall-like member being peripherally anchored within said passage means, wherein said flexible wall-like member defines at opposite sides thereof first and second chamber-like portions, wherein said second outlet means is adapted for communication with said first chamber-like portion, and wherein said valving means is carried by said flexible wall-like member for permitting varying degrees of communication between said first chamber-like portion and said second outlet means in accordance with the degree of deflection of said flexible wall-like member.

8. Fail safe apparatus according to claim 7 and further comprising spring means operatively connected to said flesible wall-like member for normally urging said wall-like member and said valving means in a direction at least tending to terminate communication between said first chamber-like portion and said second outlet means.

* * * * *